(12) United States Patent
Holzner et al.

(10) Patent No.: US 9,894,946 B2
(45) Date of Patent: Feb. 20, 2018

(54) METHOD FOR MODIFYING THE SURFACE OF AN ELASTOMER PRODUCT

(71) Applicant: SEMPERIT AKTIENGESELLSCHAFT HOLDING, Vienna (AT)

(72) Inventors: Armin Holzner, Ternitz (AT); Wolfgang Kern, Seiersberg (AT); Dietmar Lenko, Graz (AT); Jakob Cornelius Manhart, Leoben (AT); Raimund Schaller, Neunkirchen (AT); Sandra Schloegl, Stallhofen (AT)

(73) Assignee: SEMPERIT AKTIENGESELLSCHAFT HOLDING, Vienna (AT)

( * ) Notice: Subject to any disclaimer, the term of this patent is extended or adjusted under 35 U.S.C. 154(b) by 583 days.

(21) Appl. No.: 14/047,541

(22) Filed: Oct. 7, 2013

(65) Prior Publication Data
US 2014/0096307 A1 Apr. 10, 2014

(30) Foreign Application Priority Data

Oct. 9, 2012 (AT) ................. A 1086/2012

(51) Int. Cl.
*A41D 19/00* (2006.01)
*A41D 31/00* (2006.01)
(Continued)

(52) U.S. Cl.
CPC ...... *A41D 19/0082* (2013.01); *A41D 31/0011* (2013.01); *C08J 7/065* (2013.01);
(Continued)

(58) Field of Classification Search
CPC ...................................................... C08J 7/065
See application file for complete search history.

(56) References Cited

U.S. PATENT DOCUMENTS

| 7,566,502 B1* | 7/2009 | Chen | A61B 19/04 |
| | | | 2/168 |
| 2005/0044609 A1* | 3/2005 | Vistins | B32B 27/30 |
| | | | 2/159 |

(Continued)

FOREIGN PATENT DOCUMENTS

| AT | 502764 A1 | 5/2007 |
| AT | 508099 A1 | 10/2010 |

(Continued)

OTHER PUBLICATIONS

Rabel W. Wetting, Farbe und Lacke; 77 (10), 1971, pp. 997-1006.
(Continued)

*Primary Examiner* — Ian Rummel
(74) *Attorney, Agent, or Firm* — Greenblum & Bernstein, P.L.C.

(57) ABSTRACT

The invention relates to a method for modifying the surface of an elastomer product with unsaturated carbon-carbon bonds, in particular a glove, whereby the unsaturated carbon-carbon bonds in the region of the surface are at least partially saturated by a photochemical reaction with at least one thiol or by applying or dipping to apply a layer of latex to at least certain regions of the surface of the elastomer product, the unsaturated carbon-carbon bonds of which in the region of its surface are at least partially saturated by a photochemical reaction with at least one thiol.

19 Claims, 4 Drawing Sheets

(51) Int. Cl.
*C08J 7/06* (2006.01)
*C08J 7/12* (2006.01)
*C08J 7/14* (2006.01)

(52) U.S. Cl.
CPC ............... *C08J 7/123* (2013.01); *C08J 7/14* (2013.01); *C08J 2307/02* (2013.01); *C08J 2309/04* (2013.01); *C08J 2309/08* (2013.01); *C08J 2321/02* (2013.01)

(56) References Cited

U.S. PATENT DOCUMENTS

| | | |
|---|---|---|
| 2005/0119366 A1 | 6/2005 | Moy et al. |
| 2007/0105971 A1* | 5/2007 | Schaller ............... C08J 3/26 521/84.1 |
| 2012/0084901 A1 | 4/2012 | Holzner et al. |
| 2012/0107614 A1* | 5/2012 | Blum ............... B05D 5/083 428/411.1 |

FOREIGN PATENT DOCUMENTS

| | | |
|---|---|---|
| GB | 1116725 A | 6/1968 |
| JP | 2011208046 A | 10/2011 |
| WO | 2006055409 A2 | 5/2006 |

OTHER PUBLICATIONS

Owens DK, Wendt RC, J Appl Polym Sci; 13, 1969, pp. 1741-1747.
Mulazim et al., "Properties of Thiol-ene Photocurable Highly Hydrophobic and Oleophobic Nanocomposite Coatings on ABS and HIPS Substrates", *Advances in Polymer Technology,* vol. 32, No. 51, pp. E416-E426, 2013.
Schlogl et al., "Characteristics of the Photochemical Prevulcanization in a Falling Film Photoreactor", Journal of Applied Polymer Science, vol. 124, 2012, pp. 3478-3486.

* cited by examiner

METHOD FOR MODIFYING THE SURFACE OF AN ELASTOMER PRODUCT

CROSS-REFERENCE TO RELATED APPLICATIONS

The present application claims priority under 35 U.S.C. § 119(a) of Austrian Patent Application No. A 1086/2012 filed Oct. 9, 2012, the disclosure of which is expressly incorporated by reference herein in its entirety.

BACKGROUND OF THE INVENTION

1. Field of the Invention

The invention relates to a method for modifying the surface of an elastomer with unsaturated carbon-carbon bonds, in particular a glove, as well as an elastomer product, in particular a glove, with unsaturated carbon-carbon bonds and with a surface.

2. Discussion of Background Information

Modifying the surface of natural rubber gloves is already known from the prior art. For example, the surface is provided with coatings or is roughened in order to impart better lubricity to the gloves. In particular, the intention is to improve the attractability of the gloves or the attractability to moisture. Functionalization as a means of reducing potential allergies which adhere to natural rubber is also known.

The process of cross-linking natural rubber by UV by means of the thiol-ene reaction is also known from the prior art, for example from publications AT 502 764 A1 and AT 508 099 A1 by the same applicant.

SUMMARY OF THE EMBODIMENTS

The underlying objective of the invention is to propose an alternative option of modifying the surface of elastomer gloves and of modifying elastomer surfaces.

This objective is achieved on the one hand due to the fact that with the abovementioned method, the unsaturated carbon-carbon bonds in the region of the surface are at least partially saturated by a photochemical reaction with at least one thiol or a layer of latex is at least partially applied to the surface of the elastomer product by dipping, the unsaturated carbon-carbon bonds of which are saturated in the region of its surface, at least partially, by a photochemical reaction with at least one thiol, as a result of which the unsaturated carbon-carbon bonds on the surface of the elastomer product are at least partially functionalized by —SR groups, where R stands for at least one element selected from a group comprising H, vinyl compounds, acrylates, amines, amino acids (cysteine), acetylated amino acids (N-acetyl cysteine), anhydrides, carboxylic acids, ethers, epoxides, isocyanates, isothiocyanates, methacrylates, silanes, siloxanes, solid particles, polymer coatings.

The advantage of this is that the photochemical reaction takes places by means of the thiol-ene reaction mechanism, thereby enabling a high degree of efficiency to be obtained in implementing the method. Furthermore, this method can be easily implemented with a relatively high reaction speed. Photochemical activation also offers a possibility whereby saturation of the ethylenic double bonds takes place in only selective, pre-definable part regions of the surface, thereby enabling a deliberate surface structuring to be obtained in these regions. In addition, saturating the ethylenic bonds enables the tackiness of the elastomer surface to be reduced. At the same time, the resistance to aging of the elastomer can also be improved. Another advantage of this method resides in the fact that this photochemical reaction takes place at room temperature, which means that no heating is required.

Based on one embodiment of the method, free —SH groups are created on the surface of the elastomer product due to the reaction with the at least one thiol. With this embodiment, reactive points are produced on the elastomer surface. As a result, the surface prepared in this manner can be further modified, for example again by means of a thiol-ene reaction with a vinyl compound, in particular based on a photochemical reaction mechanism. This enables the range of possible surface modifications to be extended, the advantage of which is that the bonding of other substances to the elastomer surface takes place covalently so that adhesion is significantly better than would be the case with purely adhesively bonded substances. This specifically avoids situations where the substances bonded to the surface come off during use of the elastomer.

To this end, it is preferable to use a mercapto compound selected from a group comprising or consisting of trimethylolpropane-tris-3-mercaptopropionate, pentaerythritol tetramercapto-acetate, trimethylol propane trimercapto-acetate, trimethylol propane tri-3-mercapto-propionate, pentaerythritol tetra-3-mercaptopropionate, propylene glycol-3-mercaptopropionate, ethoxylated trimethylol propane tri-3-mercaptopropionate, polyol-3-mercaptopropionate, polyester-3-mercaptopropionate. These compounds may be obtained, for example, from Bruno Bock Thiochemicals and/or Sigma Aldrich. The advantage of using these thiols is that they offer a higher functionality, thereby making anchor groups available for other reactions. Furthermore, these compounds are not toxic and not carcinogenic.

The elastomer product is preferably used in a pre-cross-linked state. This enables the chemicals used to be reduced. However, it also enables the production rate to be increased. In addition, this avoids increasing the hardness of the elastomer, which might otherwise occur due to steric hindrance in the elastomer mass.

In this respect, based on one embodiment, the pre-cross-linking is likewise carried out by a photochemical process. The advantage of this is that it ensures continuity in the methods used for the overall process of manufacturing elastomer products.

The reaction with the at least one thiol may take place on a solid surface of the elastomer product. This variant of the method is used in particular to produce single-layered elastomer products since it enables targeted surface regions of the elastomer to be modified.

The free —SH groups may be reacted with at least one other chemical compound and/or with solid particles. Within the context of the invention, therefore, this enables another functionalization or a different functionalization—other than surface modification by means of thiols—thereby extending the range of applications for which the elastomer products can be used and enabling them to be adapted to the most varied range of requirements.

For this purpose, the other chemical compound may be selected from a group comprising or consisting of alkenes, acrylates, anhydrides, epoxides, isocyanates, isothiocyanates, methacrylates, thiols. The advantage obtained with these compounds is that tailor-made anchor groups can be created for other different reactions, including thermal reactions. This enables the surface polarity and lubricity properties of the elastomer product to be selectively varied.

The solid particles are preferably inorganic particles. This enables the tackiness to be reduced and improves attractability, in particular the wet attractability, of gloves because the contact surface of the elastomer with a hand is reduced.

Generally speaking, the adhesion of an elastomer product on a surface is reduced as a result of this effect. It is also possible to impart an additional functionality to the elastomer product as a result of these solid particles, for example, if solid particles which absorb moisture are used.

To improve bonding of the solid particles to the functionalized surface of the elastomer product, it is of advantage if the surface of the solid particles is also functionalized prior to the reaction with the —SH groups.

Accordingly, the solid particles can be functionalized by creating free epoxy groups, mercapto groups, acrylate groups, anhydride groups, isocyanate groups, isothiocyanate groups, methacrylate groups, vinyl groups, on the surface of the solid particles. The advantage of using these functional groups is that they can be covalently bonded to the elastomer surface, thereby reducing the risk of contamination to wounds and obtaining a lower allergy potential. This enables gloves for clean room environments to be produced.

However, the solid particles may also be functionalized with at least one chemical compound selected from a group comprising or consisting of silanes, siloxanes and carboxylic acids with functional groups, such as acrylate, anhydride, epoxy, isocyanate, isothiocyanate, mercapto, methacrylate, vinyl groups. Examples of these are vinyl triethoxysilane, (3-glycidoxypropyl)trimethoxysilane, 3-(triethoxysilyl)propylsuccinic anhydride, mercaptopropyl trimethoxysilane. These compounds may be obtained from ABCR or Sigma Aldrich.

Based on another embodiment, in order to produce so-called "powder-free" elastomer products, in particular gloves, particles that are purely adhesively bonded are removed from the surface of the elastomer product. This reduces the potential allergy of the elastomer products. These particles, which have a less pronounced effect than the covalently bonded particles, can therefore optionally be recycled to the production process.

In addition to the embodiment of the method whereby functionalization takes place on a solid elastomer surface, it is also possible within the scope of the invention for the photochemical reaction to be conducted with at least one thiol on a latex in liquid phase, after which the latex is used in a dipping process in order to produce a latex film which is cross-linked in particular. This variant of the method is used in particular to produce multi-layered elastomer products. The advantage of this is that with this variant of the method, it is possible not only to bond thiols covalently in the region of the surface on a film but also on the individual latex particles, thereby enabling the potential properties of the elastomer product to be adapted.

Another option is for epoxidation to take place in only discrete regions of the elastomer. This enables stronger structuring of the elastomer surface to be achieved, thereby enabling the lubricity of the elastomer to be influenced. In addition, specific properties can be imparted to specific regions of the elastomers by subsequently covalently bonding other chemical compounds to the thiol groups.

Based on another variant of the method, a polymer coating is applied to the surface of the elastomer product. Accordingly, this polymer coating can be covalently bonded to the elastomer surface via the thiol groups, thereby obtaining better adhesion of the polymer coating to the elastomer surface.

BRIEF DESCRIPTION OF THE DRAWINGS

To provide a clearer understanding, the invention will be explained in more detail with reference to the appended drawings.

These are to a certain extent schematically simplified diagrams, illustrating the following.

DETAILED DESCRIPTION OF THE EMBODIMENTS

Figure 1:
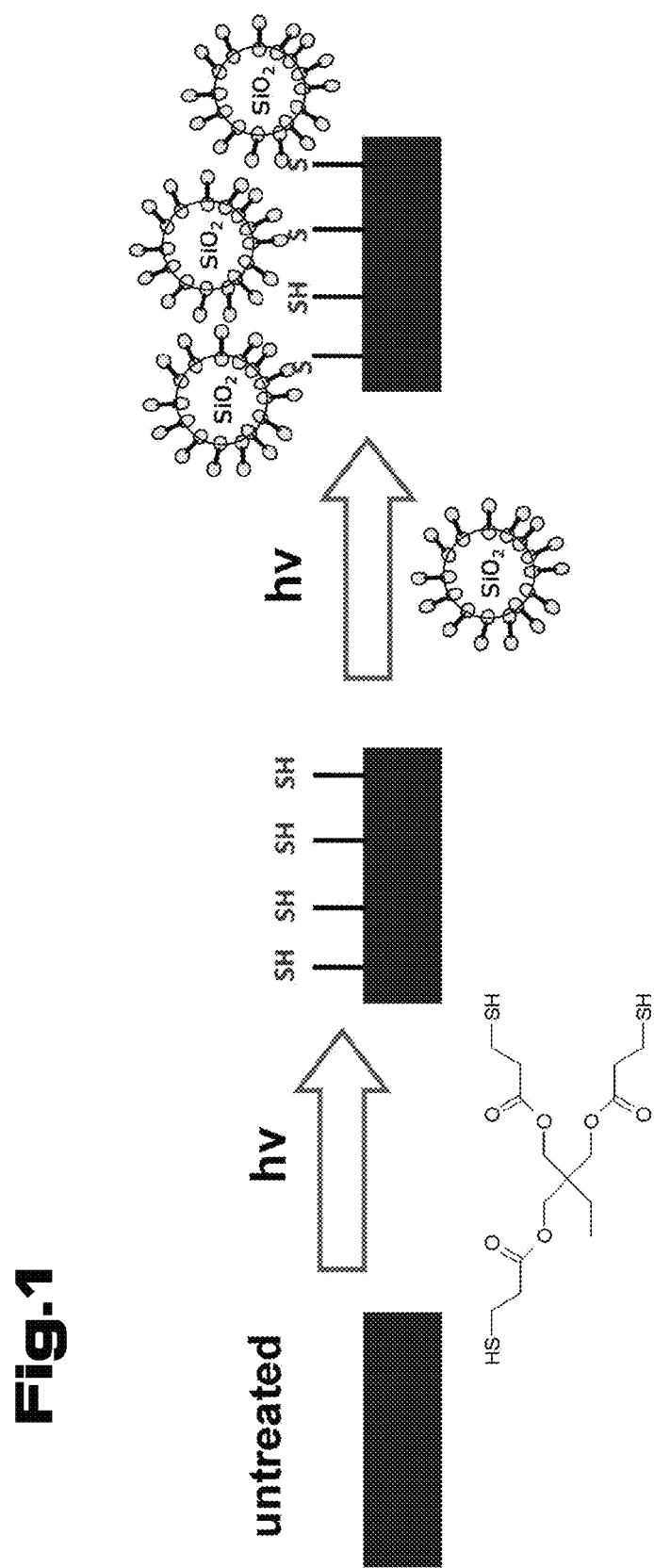
FIG. 1 modification of NR latex films with vinyl functionalized $SiO_2$ particles.

Within the context of the invention, different formulas were developed with a view to reducing the tackiness of rubber films and generally to improve or vary the properties of elastomer products.

By elastomer product is meant in particular a glove, preferably a medical glove or an examination glove. However, within the scope of the invention, it is also possible to use or process or manufacture other elastomer products, for example catheters, condoms, (medical) balloons, suckers, breathing masks, etc., and immersed articles in general, in other words products which are usually produced by a dipping process.

For the sake of completeness, it should be pointed out that an elastomer product in the context of the invention is intended to mean a product made from an elastomer which has unsaturated carbon-carbon bonds in the molecular structure, i.e. in particular ethylenic bonds (=diene rubber). The elastomer is preferably a natural rubber or a synthetic isoprene rubber. In addition, the invention also lends itself to applications using other types of rubber having such unsaturated carbon-carbon bonds, in particular homopolymers and copolymers such as nitrile butadiene rubber, carboxylated nitrile butadiene rubber, polybutadiene, polychloroprene, styrene butadiene rubber.

The dipping process used to manufacture elastomer products, in particular rubber gloves, has been extensively described in the prior art. It usually involves at least the following steps: preparing a dipping mold, coagulant dipping, latex dipping. In addition, this dipping process also includes various washing and drying steps. The dipping process is usually run on a continuous basis, for example in a so-called chain dipping plant. For further details on this subject, reference may be made to the relevant prior art.

What all the embodiments of the invention have in common is that the unsaturated carbon-carbon bond is at least partially saturated at least in the region of the surface of the elastomer product or the elastomer (hereafter, reference will merely be made to an elastomer, this term also being intended to include the elastomer product) due to a reaction with a mercapto group, preferably up to at least 2%, in particular between 3% and 75%, preferably between 4% and 10%.

The mercapto group is provided in the form of a thiol in particular. To this end, it is preferable to use thiols selected from a group comprising or consisting of trimethylolpropane-tris-3-mercaptopropionate, 16-mercaptohexadecanoic acid, (11-mercaptoundecyl)tetra(ethylene glycol), N-acetyl-L-cysteine, pentaerythritol tetramercaptoacetate, trimethylol propane trimercaptoacetate, trimethylol propane tri-3-mercaptopropionate, pentaerythritol tetra-3-mercaptopropionate, propylene glycol-3-mercaptopropionate, ethoxylated trimethylol propane tri-3-mercaptopropionate, polyol-3-mercaptopropionate, polyester-3-mercaptopropionate.

In addition to these preferred chemical compounds with a mercapto group, it would also be possible within the scope of the invention to use other such compounds, for example HS—R1R2R3, where R1 is an element from the group comprising or consisting of alkyl, aryl, alkylaryl, arylalkyl, alkylarylalkyl, arylalkylaryl, silyl-groups, R2 is an element from the group comprising or consisting of acryl, amino, amino acid, anhydride, carbonyl (C═O), carboxylic acid, carboxylate, epoxy, hydroxy, isocyanate, isothiocyanate, methacryl, mercapto, sulfonic acid, vinyl-groups, R3 is an element from the group comprising or consisting of H, alkyl, aryl groups. Examples of these are poly(ethylene glycol) methyl ether thiol, 11-mercaptol-undecanol, 16-mercapto-hexadecanoic acid, cysteamine, cysteine, 2-propene-1-thiol, cis-9-octadecene-1-thiol.

The advantage of using multi-functional thiols, i.e. chemical compounds with more than one mercapto group, such as trimethylolpropane-tris-3-mercaptopropionate, is that free mercapto groups can be created on the surface of the elastomer by means of another reaction with other chemical compounds in order to change the properties of the elastomer product.

In addition to the embodiment in which chemical compounds with multiple homo-functionality are used, in other words compounds having exclusively mercapto groups as functional groups in the molecule, another possibility is to use multi-functional chemical compounds with hetero-functionality. In the case of these compounds for example, in addition to at least one mercapto group by means of which the compound is bonded to the particle surface, at least one other functionality is provided, for example an amino group, a carboxylic acid group, an acrylate, anhydride, epoxy, isocyanate, isothiocyanate, methacrylate, vinyl group, and mixed variants are also possible, in which case more than one of these groups is present in addition to the mercapto group or groups, for example a carboxylic acid group and an amino group or an acrylate group with an anhydride group, etc.

In principle, there are two variants of the method. Firstly, it is possible to use the at least one thiol—mixtures of several different thiols may be used—to functionalize a solid surface of the elastomer. Secondly, another option is functionalization in the liquid phase of the latex, after which an appropriate mold is immersed in the latex to enable the elastomer article to be produced.

In the embodiment of the method implemented on the solid surface of the elastomer, the elastomer product is not necessarily produced using a dipping process. It is also possible to use all other molding methods known from the prior art, for example injection molding processes, extrusion processes, compression molding, etc., although the dipping method is the preferred method of manufacturing the elastomer product within the context of the invention.

In order to saturate or bring about a reaction of the unsaturated carbon-carbon bonds on a solid surface of an elastomer product, for example an elastomer film, the elastomer surface is placed in contact with the respective reagent. The elastomer is preferably used in cross-linked form and cross-linking is preferably achieved by a photo-chemical process with a thiol, as described in publications AT 502 764 A1 and AT 508 099 A1. Generally speaking, in the context of the invention, cross-linking preferably takes place by a photochemical process with a thiol. For the sake of completeness, however, it should also be pointed out that other known types of cross-linking may be used, for example peroxide pre-crosslinking or a salt bath cross-linking or cross-linking by means of actinic radiation. Similarly, sulfur cross-linking (at increased temperature) may be used as the cross-linking method, in a manner known from the prior art.

The respective reagents, in other words a single-functional or multi-functional thiol, are preferably used in the form of an emulsion. In particular, an aqueous emulsion is used, although in principle it would also be possible to use emulsions with organic solvents.

The concentration of the at least one thiol in the emulsion may be between 1% by weight and 20% by weight, in particular between 1% by weight and 10% by weight.

In addition, the emulsion may also contain various auxiliary agents, e.g. emulsifiers, for example TWEEN® 20, or stabilizers, anti-oxidants, dyes, antiozonants. The total proportion of added emulsifier(s) is preferably between 0.5% by weight and 5% by weight, relative to the total weight of the emulsion.

If the reaction takes place by a photochemical process, in particular at a wavelength or a wavelength spectrum in the visible and/or UV range, at least one photoinitiator, for example Lucirin® TPO L, is also preferably added to the emulsion. Other photoinitiators which may be used are described in AT 502 764 A1 and AT 508 099 A1, to which explicit reference may be made in this respect.

The total proportion of added photoinitiator(s) is preferably between 0.5% by weight and 5% by weight, relative to the total weight of the emulsion.

If a water-soluble thiol is used, it may be dissolved in water. Another option is to use liquid pure substances. In this case, the total proportion of water-soluble thiol(s) is between 1% by weight and 25% by weight.

The emulsion may be produced using commercially available dispersing equipment.

The emulsion or the preparation incorporating the at least one thiol is then placed in contact with the elastomer, for example by dipping the elastomer in the emulsion. The temperature for this purpose may be between 10° C. and 70° C. The duration of "wetting" may also be between 0.1 minute and 60 minutes. The wetted elastomer is then dried.

The elastomer may also be wetted with the thiol preparation in several steps, in which case intermediate drying may optionally take place between the individual steps.

In order to produce the covalent bonds between the elastomer and the at least one thiol, the wetted elastomer is exposed to an appropriate radiation source, for example a UV radiation source, e.g. an Hg lamp (not doped or doped, for example doped with gallium or iron) or a laser.

The radiation dose may be between 0.2 J/cm$^2$ and 50 J/cm$^2$, in particular between 0.5 J/cm$^2$ and 10 J/cm$^2$.

The temperature may be between 10° C. and 100° C.

Exposure to radiation may optionally take place in several steps, for example in two to eight repetitions.

After radiation, the elastomer treated in this manner may then be washed, for example with water and/or an organic solvent, and/or dried.

By treating the elastomer in this manner, the tackiness is reduced, i.e. lubricity is increased, and resistance to aging is improved.

If using multi-functional thiols, reactive groups are also created on the surface of the elastomer, for example other thiol groups or amino groups or carboxylic acid groups, as already explained above. These reactive groups may be used to provide the functionalized elastomer with other chemical compounds which are able to react with these groups.

For example, based on one embodiment of the method, the free —SH groups and/or the other specified reactive groups react with at least one other chemical compound.

The other chemical compounds may be selected from a group comprising thiols, epoxides and isocyanates. For example, a thermal bond (generally speaking, a combined variant of a photochemical reaction with a thermal reaction is possible) of the thiol is formed due to the formation of disulfide. Epoxides may react and open the ring. Bonding other chemical compounds means that the surface polarity may be varied, resistance to aging can be increased due to saturation of the C=C double bond and a different surface reactivity obtained as a result.

Depending on the reaction partner, the reaction may take place at a temperature of between 10° C. and 120° C. and on the basis of known reaction mechanisms. The duration of this reaction will likewise depend on the respective specific compounds used for the reaction and may be between 1 minute and 90 minutes. The reaction may optionally be conducted under pressure or under vacuum. It is also possible to use actinic radiation.

With the method proposed by the invention, however, it is possible to use solid particles, preferably solid particles of a type which are widely available, in particular inorganic solid particles, which are covalently, preferably exclusively covalently bonded, to the elastomer surface. These particles are preferably selected from a group comprising or consisting of sulfides, oxides, hydroxides, carbonates, borates, sulfates, phosphates, silicates, metal particles, e.g. gold, silver, copper. In particular, the solid particles are selected from a group comprising or consisting of chalk, diatomaceous earth, kaolinite, quartz, amorphous silicic acid, $SiO_2$, calcite, $TiO_2$.

However, it would also be possible to use organic solid particles, for example at least partially comprising starch or cellulose, covalently bonded to the elastomer surface.

It would also be possible to use particles with cavities, which are optionally charged with an active substance, for example zeolites or cyclodextrins. These particles may also optionally be used to adsorb substances e.g. sweat.

This bonding of solid particles to the elastomer surface also takes place by a photochemical process under the conditions described above. The reaction itself may take place both in aqueous media and in liquid organic media. One possible schematic method sequence is illustrated in FIG. 1, the solid particles in this instance being vinyl functionalized $SiO_2$-particles.

The advantage of this approach is that it enables a quantitative removal of non-covalently bonded particles because the tackiness of the elastomer surface is significantly reduced in the first step die to saturation of the unsaturated carbon-carbon bonds.

In the specific situation illustrated in FIG. 1, a tri-functional thiol (trithiol) was bonded to the NR-surface by the UV-initiated thiol-ene reaction. As a result of this modification, a major part of the C=C-double bonds is saturated and the film loses its tackiness. Vinyl functionalized $SiO_2$-particles on the surface are bonded to the free —SH groups by means of a second thiol-ene reaction.

It is of advantage if the surface of the solid particles is functionalized prior to the reaction with the —SH groups of the elastomer surface. This functionalization on the surface of the solid particles may be obtained, for example, by creating free epoxy groups, mercapto groups, acrylate groups, anhydride groups, isocyanate groups, isothiocyanate groups, methacrylate groups, vinyl groups. In particular, a chemical compound selected from one of the groups mentioned above may be used for this purpose.

The solid particles may be bonded to the elastomer surface using the method sequence generally described above by means of the mercapto group and/or other functional groups on the elastomer surface, such as, for example, the functional groups listed above, and in particular by a photochemical process.

However, it would also be possible to bond the solid particles thermally to the elastomer surface, i.e. bond them covalently. To this end, it is preferable to use solid particles, the surface of which has been modified with epoxy groups and/or amino groups. These modified solid particles may be obtained by reacting the solid particles with the compounds listed above under the conditions described above.

The functionalized solid particles are suspended in water or an organic solvent. This suspension is then placed in contact with the functionalized elastomer surface, for example by dipping the elastomer in the suspension. This may optionally be repeated several times.

Treated in this manner, the elastomer is then dried. The temperature may be selected from a range of 40° C. to 150° C., in particular from a range of 40° C. to 100° C. Drying may take place for a period of between 5 minutes and 1000 minutes, in particular for a period of between 10 minutes and 900 minutes.

The thermal bonding of the solid particles to the elastomer surface takes place during drying.

It is also possible to conduct the above-mentioned other functionalization of the functionalized elastomer surface with at least one other chemical compound by a thermal process under these conditions.

After bonding, it is preferable to remove purely adhesively bonded particles from the surface of the elastomer product, for example by washing and/or mechanically, for example by means of ultrasound.

The solid particles used for the purpose of the invention preferably have a particle size of between 0.01 µm and 1000 µm, in particular between 0.1 µm and 10 µm.

Based on another variant of the method, the photochemical reaction with the at least one thiol takes place on a latex in liquid phase, and the latex is then dipped to apply a latex film, which has preferably been previously cross-linked in particular, preferably photochemically pre-crosslinked.

To this end, at least one thiol may be dissolved in a solvent, in particular water, and it is also possible to use organic solvents. The at least one thiol may be selected from the thiols listed above. It is preferable to use N-acetyl cysteine and/or cysteine and/or ethoxylated trimethylolpropane-tri-3-mercaptopropionate.

The quantity of solvent is preferably measured so that, after adding the latex, a solid content of between 15% drc (dry rubber content) and 40% drc, in particular between 20% drc and 30% drc, is obtained.

The proportion of the at least one thiol in the solution without latex may be between 0.5 phr and 50 phr, in particular between 1 phr and 20 phr.

In addition to the at least one thiol, the solution preferably also contains at least one photoinitiator. Possible photoinitiators are described in AT 502 764 A1 and AT 508 099 A1, to which reference may be made.

The total proportion of the at least one photoinitiator may be selected from a range of 0.5 phr to 5 phr, in particular from a range of 1 phr to 2 phr, relative to the latex.

The constituents of the solution without latex may be dissolved at a temperature of between 10° C. and 50° C. and/or for a period of between 0.5 minutes and 60 minutes.

This solution together with the added latex then undergoes a photochemical reaction, preferably with a wavelength or a wavelength spectrum from the visible and/or UV-range. The radiation source may be selected from the radiation sources listed above.

The radiation dose may be between 0.2 J/cm$^2$ and 50 J/cm$^2$, in particular between 0.5 J/cm$^2$ and 10 J/cm$^2$.

The temperature may be between 10° C. and 100° C.

Exposure to radiation may take place in several steps, for example in two to eight repetitions.

Before and/or after radiation, other process chemicals may be added to the treated latex, e.g. anti-aging agents, stabilizers, antiozonants, anti-foaming agents, dyes, inorganic fillers, e.g. chalk.

In order to produce an elastomer product, in a first step, a first layer is then produced from an elastomer, for example using a known dipping process, and this is pre-crosslinked, in particular photochemically pre-crosslinked. After at least one drying and/or optionally at least one washing step, the modified latex, functionalized as explained above, is used to apply at least one other elastomer layer to the initially produced elastomer layer, in particular by dipping. This is again followed by at least one drying and/or at least one washing step.

Based on another embodiment of the method, at least certain regions of the elastomer surface are provided with a polymer layer which is covalently bonded to the elastomer surface.

To this end, in a first step, the elastomer surface is functionalized with at least one thiol so that at least one type of the above-mentioned functional groups (—SH, —COOH, —NH$_2$, epoxide, —NCO, —NCS) is present on the elastomer surface. Bonding itself may be by a photochemical or thermal process, as already explained above.

For example, the polymer layer may be made from a polyurethane or a silicone or a mixture of SBR with silicone or an acrylate or a siloxane or a polymer with functional groups, in particular alkenes, acrylates, anhydrides, epoxides, isocyanates, isothiocyanates, methacrylates, thiols, in order to obtain a covalent bond on the elastomer surface. The polymers or monomers used to form the polymer layer may likewise be functionalized beforehand, in particular with at least one type of the above mentioned functional groups.

The functional groups on the polymer may be present as side groups or independently.

Preferred polymers are silicones, polyurethanes, urethane acrylates, acrylates, polyisocyanates, polyesters, polyols, vinyl polymers, diene elastomers. Examples of these are Desmophen® 1652, Synthomer VL 11005, Desmolux® XP 2740, Bayhydrol® UV XP 264, Desmolux® VP LS 2299, polyvinyl alcohol, polyacrylic acid, which may be obtained from Bayer or Synthomer.

Again, suspensions are produced from the optionally functionalized polymers or monomers or oligomers (for functionalization purposes, the respective reagent may be added to this suspension), or the polymer is used in the form of a pure substance. At least one emulsifier and/or at least one photoinitiator may be added to the polymer. The concentrations may be selected from those specified above.

This suspension is then applied to an elastomer, in particular one which has been pre-crosslinked, preferably pre-crosslinked by a photochemical process, in particular by dipping, optionally dried, and then exposed to radiation, for which purpose the radiation sources and radiation parameters listed above may be used.

The monomers or oligomers or the polymer applied to the elastomer surface may also be further cross-linked after bonding.

In principle, one option is to use at least one type of particle for the entire surface of the functionalized elastomer provided with at least one other chemical compound and/or with solid particles and/or with the polymer coating.

Figure 2:
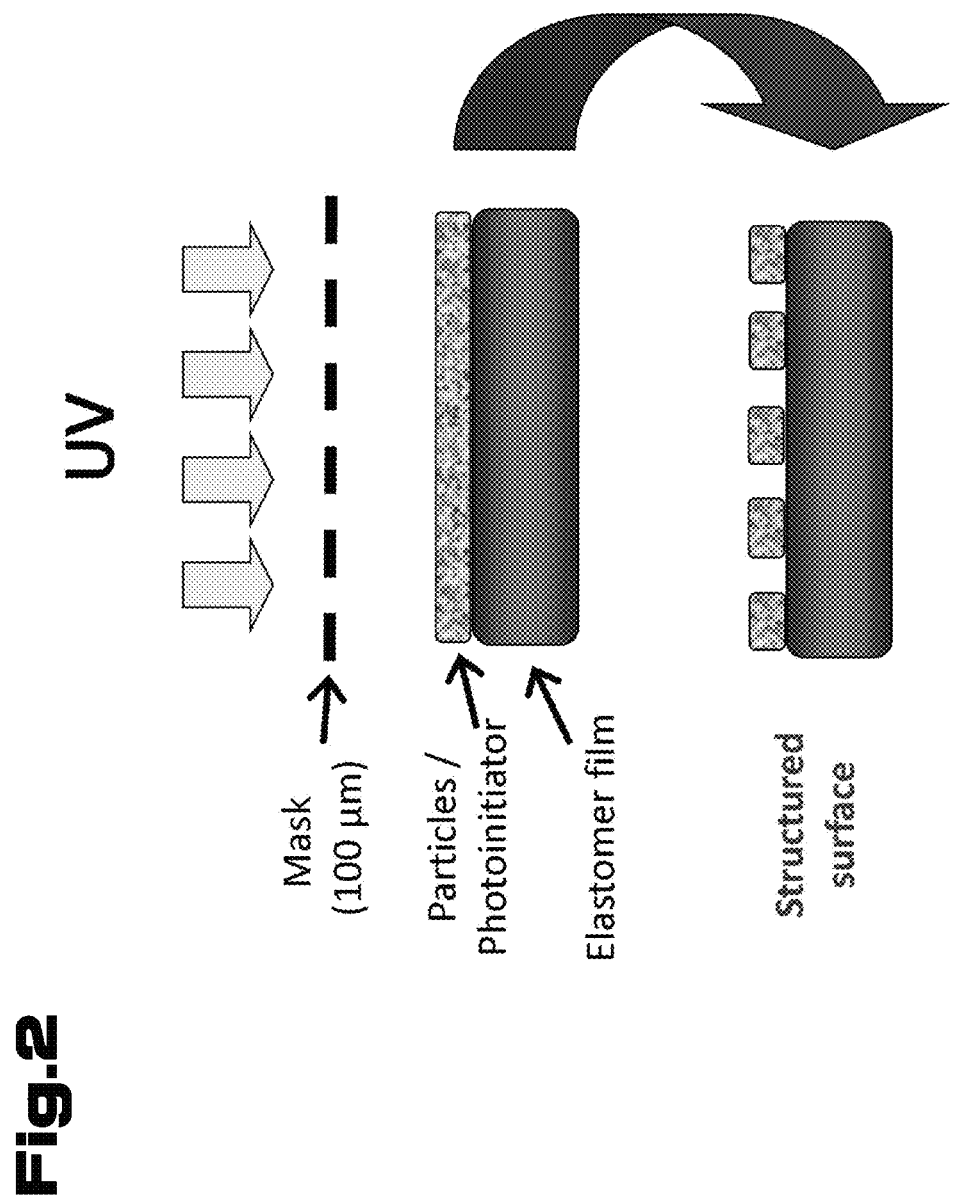
FIG. 2 irradiating polymers to impart structure.

To this end, based on one embodiment however, the at least one other chemical compound and/or the solid particles and/or the polymer coating may be disposed only in discrete regions on the elastomer surface. In order to achieve this, the region of the elastomer surface which does not have to be further functionalized is covered by means of an appropriate mask during exposure to the radiation source, as illustrated in FIG. 2, so that during a subsequent washing step, the substances which have not photochemically reacted and therefore have not been covalently bonded are washed away.

Based on another although not preferred embodiment, it is possible for the at least one other chemical compound and/or the solid particles and/or the suspension used for the polymer coating to be applied in only discrete regions.

The mask may be a mechanical mask or a chemical mask or an optical mask. By chemical mask is meant a substance which is applied to the regions which do not have to be coated, for example applied by painting, before applying the respective suspensions or emulsions.

In addition to imparting the pure surface structuring, it is also possible, for example, to apply permanent information to the elastomer product, for example the glove size in the case of elastomer gloves.

In the description given above, although only the at least partial, preferably complete, saturation of the unsaturated carbon-carbon bonds of the elastomer is explained, it is also possible in principle, although not preferred, for the unsaturated carbon-carbon bonds within the elastomer to be at least partially saturated with at least one thiol by a photochemical process.

With the exception of the first embodiment of the method proposed by the invention described above, in all the other methods proposed by the invention, a functionalization of the functionalization, i.e. the functionalized elastomer surface, takes place. The functional groups disposed on the surface after the first functionalization therefore act as anchor groups for the other functionalization.

The photochemical bonding of the at least one thiol to the elastomer surface takes place by means of the thiol-ene reaction.

Using the method proposed by the invention, elastomer products can be manufactured which have a better lubricity and a better resistance to aging than is the case with an untreated elastomer. Furthermore, it is also possible to influence properties such as wettability, polarity, lubricity, and totally new properties can be imparted to the elastomer product, such as structured elastomer surfaces, smell, color, "look and feel". Depending on the choice of thiol, polar or non-polar properties can be imparted to the elastomer surface.

Figure 3:
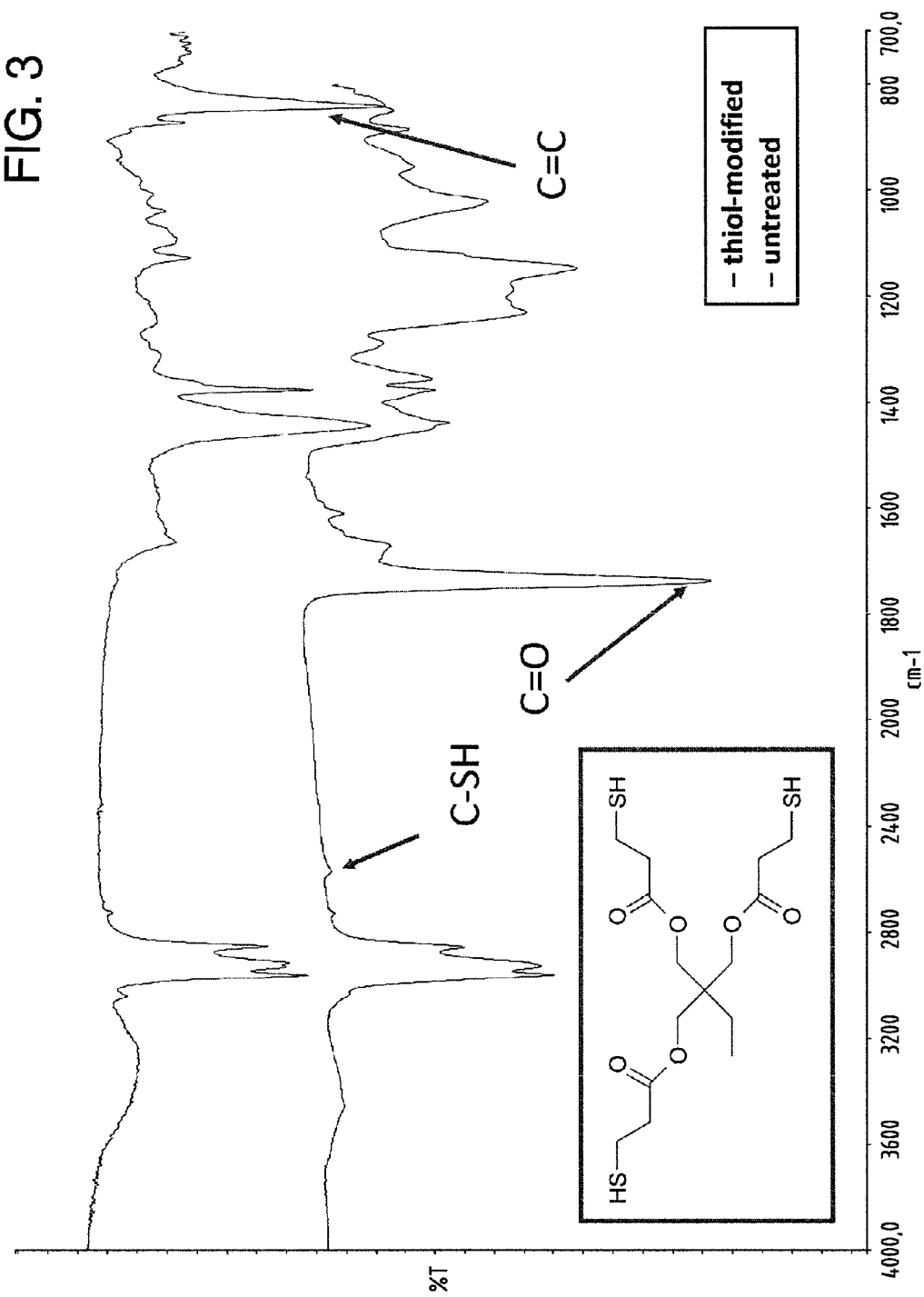
FIG. 3 comparison of the IR spectra of polyisoprene films that are untreated and films modified with trithiol.

In order to evaluate the covalent bond between the elastomer and the thiol, trithiol was chosen as a model substance and a polyisoprene. Samples were tested by means of infrared spectroscopy. FIG. 3 illustrates a spectrum image.

From the results of the infrared spectroscopy, it may be concluded that the trithiol was attached to the elastomer surface by a covalent bond because the C=C double bonds (831 cm-1) are reduced in number as a result of the modification. In addition, the modified elastomer surfaces showed evidence of IR-bands at 2430 cm-1 and 1735 cm-1, which are attributable to the trithiol.

Additional contact angle measurements were taken on NR latex films modified with trithiol. The result is set out in FIG. 4.

Incorporating trithiol increases the proportion of both polar and disperse energy of the surface energy of the polyisoprene surface—i.e. the wettability and polarity of the surface increase, as may be seen from the table below.

| Thiol concentration [% by weight] | Polar energy proportion | Disperse energy proportion | Total surface energy |
|---|---|---|---|
| 0 | 1.0 | 34.6 | 35.6 |
| 1.5 | 4.7 | 34.5 | 39.2 |
| 5 | 3.6 | 36.2 | 39.8 |
| 10 | 2.7 | 43.9 | 46.8 |

Figure 4:
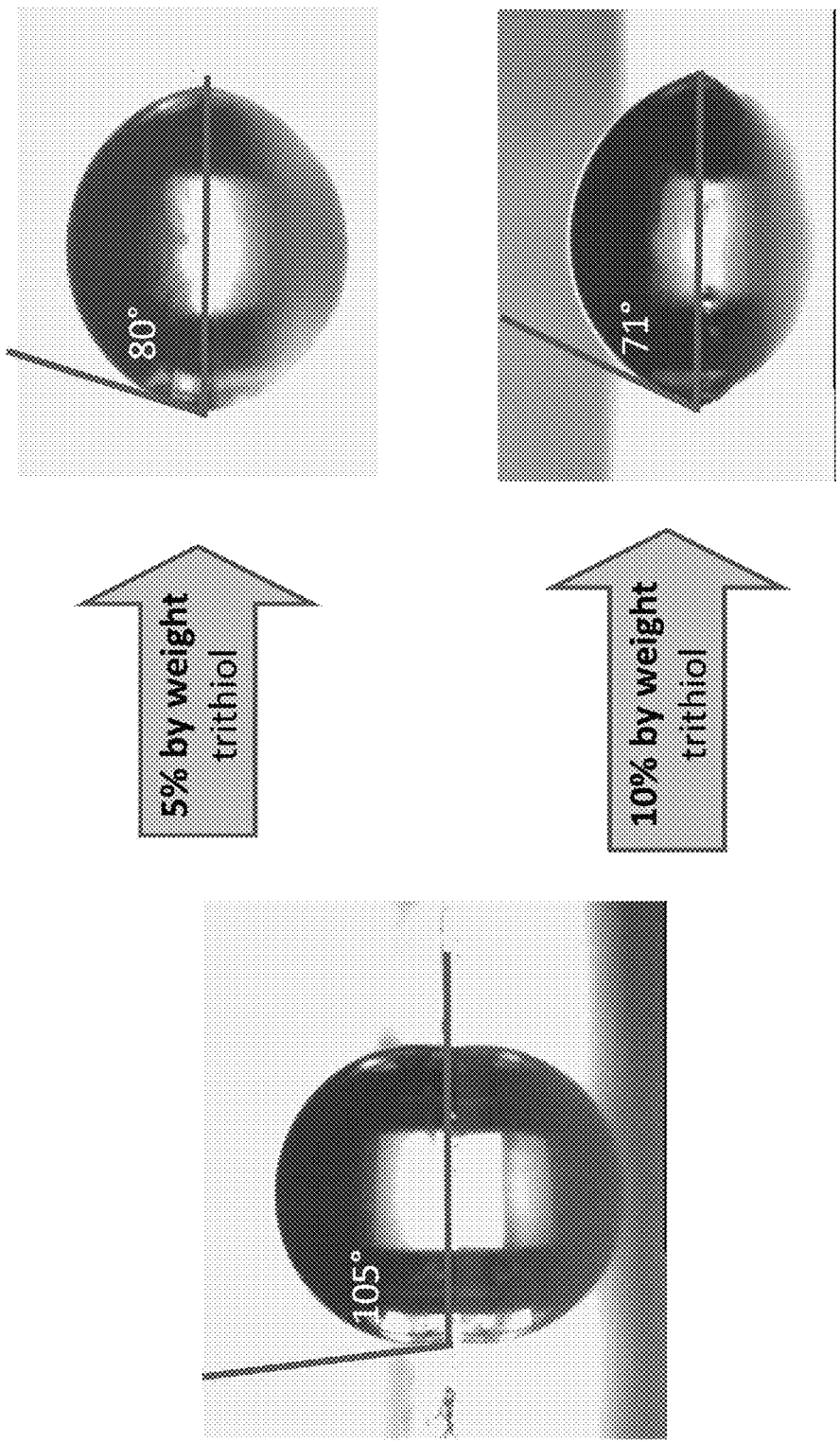
FIG. 4 illustrates the change in the contact angle of water due to surface functionalization by means of trithiol.

As may be seen from FIG. 4, the contact angle of 105° of the untreated NR latex is reduced to 80° with 5% by weight of trithiol or 71° with 10% by weight trithiol.

Generally speaking, using the method proposed by the invention, a reduction in the contact angle to water of at least 10% can be obtained, compared with the untreated elastomer surface. Using N-acetyl cysteine, the polarity of the elastomer surface can even be almost doubled (in the case of untreated NR latex film, reduction from 105° to 54° with 5% by weight N-acetyl cysteine).

Interestingly, it was found that the contact angles increase again (74)° when using 10% by weight of N-acetyl cysteine.

It was also found that the polarity drops again due to the covalent bonding of solid particles (modification with vinyl functionalized $SiO_2$ particles: water contact angle) 91°.

In other words, the method proposed by the invention may be used to produce elastomers with "tailor-made" polarities at the surface. This being the case, the reactivity of the elastomer surface can also be adjusted accordingly.

The measurements were conducted as specified by Owens D K, Wendt R C. Estimation of the surface free energy of polymers. J Appl Polym Sci 1969; 13(8):1741-1747 and Rabel W. Wetting theory and its application to the study and use of the surface properties of polymers. Farbe and Lacke. 1971; 77(10):997-1006.

The modified surfaces were also characterized by means of Zeta potential measurements. In the case of non-modified natural rubber surfaces, the isoelectric point (□=0) was at 3.45, which indicates a weakly negatively charged surface. Inert polymer surfaces, e.g. polypropylene, have an isoelectric point (□=0) of 3.8-4.1 but proteins, phospholipids and other incorporated organic substances can cause a shift in the NR surface into the acid range.

Functionalization with trithiol (SH-functionalized surface) enables an isoelectric point (IEP) of 3.0 to be obtained, which indicates a stronger negatively charged surface. This value is comparable with OH-functionalized surfaces, which also have an IEP in the region of 3.0. Due to the covalent bonding of the vinyl particles to the mercapto group, the properties of an inert surface are imparted to the film. This was confirmed by Zeta potential measurements because the IEP shifted from 3.0 to 3.9. The sample functionalized with vinyl particles was characterized on the basis of a double measurement. A matching IEP was obtained for both measurements, which indicates a covalent bonding of the particles.

In another series of tests conducted using tribological measuring methods with a linear tribometer as specified by B. Bhushan, Modern tribology handbook. CLC-Press, Boca Raton, London, New York, Washington D.C. 2001, the coefficient of friction of NR surfaces modified with particles was measured and compared with the properties of commercial surgical gloves. The results set out in the table below show that the lubricity properties of surfaces modified by particles fall within the range of powdered NR surfaces.

Comparison of coefficients of friction of selected NR surfaces

| Description of sample | Coefficient of friction |
|---|---|
| Prior art glove with chlorinated interior | m ~0.31 |
| Prior art glove with coated interior | m ~0.22 |
| Prior art glove with powdered interior | m ~0.50 |
| NR surface modified by vinyl particles | m ~0.55-0.77 |

A few examples developed during the course of work on the invention will be described below, although these are not intended to be restrictive.

The chemicals used for the examples are set out in Table 1.

TABLE 1

Materials and chemicals used

| Chemical | Manufacturer | Structural formula, specification |
|---|---|---|
| Aktisil ® MM | Hoffmann Mineral | Mercapto-modified $SiO_2$ particles ($d_{50}$ = 2.2 µm) |
| Aktisil ® VM 56 | Hoffmann Mineral | Vinyl-modified $SiO_2$ particles ($d_{50}$ = 2.2 µm) |
| TWEEN ® 20 | Sigma Aldrich | 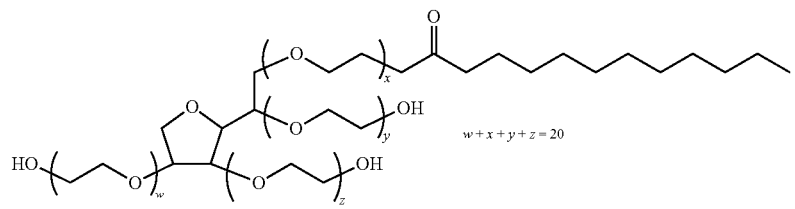 $w+x+y+z=20$ |

TABLE 1-continued

Materials and chemicals used

| Chemical | Manufacturer | Structural formula, specification |
|---|---|---|
| Lucirin ® TPO-L | BASF | |
| Genocure ® DMHA | Rahn AG | |
| Irgacure ® 2959 | Sigma Aldrich | |
| N-acetyl cysteine<br>L-cysteine | Sigma Aldrich<br>Sigma Aldrich | |
| Trimethylol propane-tris-3-mercaptopropionate (trithiol) | Bruno Bock Chemische Fabrik GmbH Co KG | |
| Bayhydrol ® UV XP 2649 | Bayer | Urethane acrylate dispersion |
| Bayhydrol ® UV XP 2740 | Bayer | Acrylate dispersion |
| Styrene butadiene Poly(mercaptopropyl) methyl siloxane | ABCR | Re-dispersible polymer dispersion |

Example 1: Modification of a Dried Film Surface, Bonding of Tri-Functional Thiol Derivatives (Generation of Free SH Groups)

To perform a photochemical bonding of trithiol by means of a thiol-ene reaction, the following steps are implemented:

- An aqueous emulsion is prepared from 10% by weight trithiol, 1.1% by weight TWEEN 20 and 1% by weight Lucirin TPO L
- The emulsion is dispersed by means of a dispersing device (Ultraturax) for 5 min at room temperature
- A UV pre-crosslinked NR latex film is immobilized in a Petri dish with adhesive tape
- The aqueous emulsion is poured over the elastomer film
- The film is removed from the Petri dish after 10 min
- Sample dried for 1 min at 100° C.
- Sample exposed to radiation with Hg lamp (Fusion UV) (parameters: see Table 2)

TABLE 2

Device parameters for radiation system
(Fusion UV) for SH-functionalization

| Device parameters | Settings |
|---|---|
| Passes | 1-4 |
| Lamp type | Mercury lamp (not doped and Ga doped) |
| Lamp power | 40%-60% |

TABLE 2-continued

Device parameters for radiation system
(Fusion UV) for SH-functionalization

| Device parameters | Settings |
|---|---|
| Conveyer belt speed | 3.5 m/min-6 m/min |
| Radiation dose | 0.5 J/cm² -25 J/cm² |

Washing 10 min in $H_2O_{deion.}$ and 10 min in ethanol whilst stirring (magnetic stirrer)
Functionalized sample then dried for 10 min at 100° C.

Example 2: Modification of a Dried Film Surface, Bonding of Mono-Functional Thiol Derivatives (Generation of Free $NH_2$ and COOH Groups)

Photochemical bonding of N-acetyl cysteine or cysteine via a thiol-ene reaction takes place by means of the following steps:
an aqueous emulsion is prepared from 1-10% by weight N-acetyl cysteine or cysteine, 1.1% by weight TWEEN 20 and 1% by weight Lucirin TPO L
The other steps are the same as those described in connection with example 1.

Example 3: Photochemical Modification of the Liquid Phase

Photochemical bonding of N-acetyl cysteine or cysteine via a thiol-ene reaction takes place by means of the following steps:
process chemicals (1-2 phr Irgacure, 1-20 phr L-cysteine or N-acetyl cysteine) dissolved in deionized water whilst stirring at increased temperature. Quantity of water measured so as to obtain a solid content of 30% drc after adding NR latex.
process chemical solution added to a pre-vulcanized NR latex
mixture stirred at RT for 2 h with magnetic stirrer
16 ml of the mixture transferred to a glass Petri dish (1 mm layer thickness)
mixture illuminated by means of Hg lamp or Ga-doped Hg lamp (Fusion UV) (parameters: see Table 3)

TABLE 3

Device parameters of the lighting system
(Fusion UV) for modifying latex

| Device parameter | Settings |
|---|---|
| Passes | 1-4 |
| Lamp type | Mercury lamp (not doped and Ga-doped) |
| Lamp power | 40%-60% |
| Conveyer belt speed | 3.5 m/min-6 m/min |
| Radiation dose | 0.5 J/cm² -25 J/cm² |

Alternatively, UV radiation may also take place in the falling film reactor
0.5 phr Ralox (anti-aging agent) added to mixture
mixture stirred at RT for 2 h with magnetic stirrer
The corresponding latex films are produced by a two layer dipping process:
a porcelain mold is dipped (20 s at RT) in a pre-crosslinked NR latex
drying for 0 s-15 s at 120° C.
the modified NR latex is dipped (30 s at room temperature RT (ca. 20° C.)
drying for 60 s-90 s at 120° C.
washing in $H_2O_{deion.}$ at 80° C. for 60 s
drying for 15 min at 120° C.
washing in $H_2O_{deion.}$ at 80° C. for 60 s
drying for 5 min at 120° C.

Example 4: Photochemical Bonding of Inorganic Particles, Implemented in Aqueous Systems The following process steps are implemented during the course of photochemically bonding inorganic $SiO_2$ macro-particles:
an aqueous suspension is prepared from 0.015% by weight-0.5% by weight vinyl or —SH-modified $SiO_2$ macro-particles, 0.15% by weight-0.7% by weight TWEEN 20 and 1.7% by weight Genocure DMHA
the suspension is dispersed in the ultrasound bath for 10 min-20 min at room temperature
an —SH functionalized NR latex film (see example 1) is immobilized in a Petri dish
the aqueous suspension is poured over the elastomer film
film removed from the Petri dish after 2 min
sample dried for 10 min at 70° C.
sample irradiated with Hg lamp (Fusion UV) (see Table 3)
irradiated film washed in water for 16 h at room temperature
film dried for 10 min-15 min at 70° C.

Example 5: Photochemical Bonding of Inorganic Particles, Implemented in Organic Solvents a suspension is prepared from 0.015% by weight-0.2% by weight vinyl or —SH modified $SiO_2$ macro-particles and 1.7% by weight Lucirin TPO-L in toluene
the suspension is dispersed in the ultrasound bath for 10 min at room temperature
the suspension is poured over the elastomer film lying in a Petri dish. The film is prevented from floating by means of tweezers.
film removed from the Petri dish after 2 min
sample dried for 10 min at 70° C.
sample irradiated with Hg lamp (Fusion UV) (see Table 3)
irradiated film washed in toluene for 16 h at room temperature
film dried for 10 min-45 min at 70° C.

Example 6: Thermal Bonding of Inorganic Particles, Implemented in Aqueous Systems The following process steps are implemented during the course of thermally bonding inorganic $SiO_2$ macro-particles:
an aqueous suspension is prepared from 0.015% by weight-0.5% by weight epoxy-modified $SiO_2$ macro-particles
the suspension is dispersed by a dispersing device (Ultra-turax) for 10 min at room temperature and then in the ultrasound bath for 10 min at room temperature
an SH-functionalized NR latex film (see above) is immobilized in a Petri dish
the aqueous suspension is poured over the elastomer film
film removed from the Petri dish after 2 min
sample dried for 10 min-900 min at 40° C.-100° C.
film washed in water for 16 h at room temperature
film dried for 10 min-45 min at 70° C.

Example 7: Thermal Bonding of Inorganic Particles, Implemented in Organic Solvents a suspension is prepared from 0.015% by weight-0.2% by weight of epoxy-modified $SiO_2$ macro-particles in toluene the suspension is dispersed in the ultrasound bath for 10 min at room temperature the aqueous suspension is poured over the elastomer film. Film prevented from floating by means of tweezers film removed from the Petri dish after 2 min sample dried for 10 min-900 min at 40° C.-100° C.

film washed in toluene for 16 h at room temperature film dried for 10 min-15 min at 70° C.

Example 8: Photochemical Bonding of Polymer Coatings

The following process steps are implemented during the course of photochemically bonding selected polymer coatings:

the polymer coatings:
a) Bayhydrol® UV XP 2649 (urethane acrylate dispersion)
b) Re-dispersed styrene butadiene dispersion (40% by weight in $H_2O_{deion}$)
c) Bayhydrol® UV XP 2740 (acrylate dispersion)
d) Poly(mercaptopropyl)methyl siloxane
are added to 1% by weight Lucirin TPO L and optionally 1% by weight-5% by weight trithiol (emulsified with 1.1% by weight Tween 20 in $H_2O_{deion}$) and dispersed in a dispersing unit (Ultraturax).

the coatings are applied to pre-crosslinked and SH functionalized (see example 1) NR latex films by dipping (15 s-45 s at room temperature)

the coatings are dried for 15 min at 70° C.

sample irradiated with Hg lamp (Fusion UV) (parameters: see Table 4)

TABLE 4

Device parameters of the radiation system (Fusion UV) for bonding polymer coatings

| Device parameter | Settings |
| --- | --- |
| Passes | 1-3 |
| Lamp type | Mercury lamp (not doped) |
| Lamp power | 30%-40% |
| Conveyer belt speed | 3 m/min-6 m/min |
| Radiation dose | 0.5 J/cm$^2$-25 J/cm$^2$ |

Example 9: Thermal Bonding of Polymer Coatings

To obtain a thermal bonding of polymer coatings, the bonding reactions of polymer coatings to a photochemically modified surface set out in Table 5 were implemented.

TABLE 5

Thermal bonding of polymer coatings to a photochemically modified elastomer surface - surface modified in the dried state

| NR surface Photochemically modified | Polymer coating thermally bonded Substance category |
| --- | --- |
| —SH | Polymers with epoxide groups |
| —SH | Polymers with mercapto group |
| —COOH | Polymers with epoxide groups |

The embodiments described as examples represent possible embodiments of the invention.

The invention claimed is:

1. A method of modifying a surface of a dien rubber glove having unsaturated carbon-carbon bonds for reducing tackiness of the dien rubber glove, comprising at least partially saturating the unsaturated carbon-carbon bonds in a region of the surface by a photochemical reaction with at least one thiol for reducing tackiness of the dien rubber glove, or by applying or dipping to apply a layer of latex to at least certain regions of the surface of the dien rubber glove, wherein unsaturated carbon-carbon bonds of the layer of latex are at least partially saturated by a photochemical reaction with at least one thiol for reducing tackiness of the dien rubber glove.

2. The method according to claim 1, wherein free —SH groups are created on the surface of the dien rubber glove due to the reaction with the at least one thiol.

3. The method according to claim 1, wherein at least one chemical compound selected from the group consisting of trimethylolpropane-tris-3-mercaptopropionate, pentaerythritol tetramercaptoacetate, trimethylol propane trimercaptoacetate, trimethylol propane tri-3-mercaptopropionate, pentaerythritol tetra-3-mercaptopropionate, propylene glycol-3-mercaptopropionate, ethoxylated trimethylol propane tri-3-mercaptopropionate, polyol-3-mercaptopropionate, and polyester-3-mercaptopropionate is used as thiol.

4. The method according to claim 1, wherein the dien rubber glove being modified is pre-crosslinked.

5. The method according to claim 4, wherein pre-crosslinking is implemented photochemically.

6. The method according to claim 1, wherein the reaction with the at least one thiol is implemented on a solid surface of the dien rubber glove.

7. The method according to claim 2, wherein the free —SH groups are reacted with at least one other chemical compound and/or with solid particles.

8. The method according to claim 7, wherein the at least one other chemical compound is at least one compound selected from the group consisting of alkenes, acrylates, anhydrides, epoxides, isocyanates, isothiocyanates, methacrylates, and thiols.

9. The method according to claim 7, wherein the solid particles are inorganic particles.

10. The method according to claim 7, wherein the surface of the solid particles is functionalized prior to the reaction with the —SH groups.

11. The method according to claim 10, wherein the solid particles are functionalized by creating free epoxy groups, mercapto groups, acrylate groups, anhydride groups, isocyanate groups, isothiocyanate groups, methacrylate groups, and/or vinyl groups, on the surface of the solid particles.

12. The method according to claim 10, wherein functionalization of the solid particles is implemented with at least one chemical compound selected from the group consisting of silanes, siloxanes and carboxylic acids, all with functional groups.

13. The method according to claim 7, wherein reacted particles are removed from the surface of the dien rubber glove.

14. The method according to claim 1, wherein the photochemical reaction is implemented with at least one thiol, the latex is in liquid phase and the latex is then applied as a latex film, which is pre-crosslinked.

15. The method according to claim 1, wherein the surface modification is implemented in discrete regions of the dien rubber glove.

16. The method according to claim 1, wherein a polymer coating is applied to the surface of the dien rubber glove.

17. The method according to claim 12, wherein the functional group at least one selected from the group consisting of acrylate, anhydride, epoxy, isocyanate, isothiocyanate, mercapto, methacrylate, and vinyl groups.

18. The method according to claim 12, wherein the chemical compound is at least one selected from the group consisting of vinyl triethoxysilane, (3-glycidoxypropyl) trimethoxysilane, 3-(triethoxysilyl)propylsuccinic anhydride, and mercaptopropyl trimethoxysilane.

19. A method of modifying a surface of an elastomer product having unsaturated carbon-carbon bonds, comprising at least partially saturating the unsaturated carbon-carbon bonds in the region of the surface by a photochemical reaction with at least one thiol, or by applying or dipping to apply a layer of latex to at least certain regions of the surface of the elastomer product, wherein unsaturated carbon-carbon bonds of the layer of latex are at least partially saturated by a photochemical reaction with at least one thiol;

wherein free —SH groups are created on the surface of the elastomer product due to the reaction with the at least one thiol, and the free —SH groups are reacted with at least one other chemical compound and/or with solid particles, wherein the surface of the solid particles is functionalized prior to the reaction with the —SH groups, wherein functionalization of the solid particles is implemented with at least one chemical compound selected from the group consisting of silanes, siloxanes and carboxylic acids, all with functional groups, and wherein the chemical compound is at least one selected from the group consisting of vinyl triethoxysilane, (3-glycidoxypropyl)trimethoxysilane, 3-(triethoxysilyl)propylsuccinic anhydride, and mercaptopropyl trimethoxysilane.

\* \* \* \* \*